US011904735B2

(12) United States Patent
Kondrad et al.

(10) Patent No.: US 11,904,735 B2
(45) Date of Patent: Feb. 20, 2024

(54) TRANSLATION ASSEMBLY FOR A VEHICLE

(71) Applicant: Ford Global Technologies, LLC, Dearborn, MI (US)

(72) Inventors: Marcos Silva Kondrad, Macomb Township, MI (US); Kevin VanNieulande, Fraser, MI (US); Patrick Maloney, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 462 days.

(21) Appl. No.: 17/237,685

(22) Filed: Apr. 22, 2021

(65) Prior Publication Data

US 2022/0340050 A1 Oct. 27, 2022

(51) Int. Cl.
*B60N 2/07* (2006.01)
*B60N 2/02* (2006.01)

(52) U.S. Cl.
CPC ....... *B60N 2/0722* (2013.01); *B60N 2/02246* (2023.08)

(58) Field of Classification Search
CPC ........ B60N 2/06; B60N 2/07; B60N 2/02246; B60N 2/02253; B60N 2/0722; B60N 2/073; F16C 29/12; F16C 29/123; F16C 29/126
See application file for complete search history.

(56) References Cited

U.S. PATENT DOCUMENTS

| | | | |
|---|---|---|---|
| 5,445,354 A | 8/1995 | Gauger et al. | |
| 7,314,242 B2 * | 1/2008 | Masunaga | B60N 2/0715 296/65.13 |
| 9,126,505 B2 * | 9/2015 | Moriyama | B60N 2/0722 |
| 10,486,554 B2 | 11/2019 | Napau et al. | |
| 2005/0253036 A1 | 11/2005 | Li et al. | |
| 2013/0020459 A1 * | 1/2013 | Moriyama | B60N 2/0722 248/636 |
| 2014/0110554 A1 * | 4/2014 | Oya | B60N 2/0722 248/430 |
| 2017/0166091 A1 | 6/2017 | Cziomer et al. | |
| 2018/0086231 A1 * | 3/2018 | Kume | B60N 2/0722 |
| 2019/0202329 A1 * | 7/2019 | James | B60N 2/809 |

(Continued)

FOREIGN PATENT DOCUMENTS

WO 2020077209 A2 4/2020

*Primary Examiner* — Gregory A Blankenship
(74) *Attorney, Agent, or Firm* — Vichit Chea; Price Heneveld LLP

(57) ABSTRACT

A translation assembly for a vehicle includes a rail assembly that defines a first channel, a second channel, and a central member that extends between the first and second channels. A carriage assembly couples to the rail assembly. The carriage assembly is movable relative to the rail assembly. The carriage assembly includes a first rail engagement structure that extends into the rail assembly and is received within the first channel; a second rail engagement structure that extends into the rail assembly and is received within the second channel; and a carriage housing that is coupled to the first and second rail engagement structures. The carriage housing extends between the first and second rail engagement structures. The carriages assembly also includes one or more drive assemblies that engage with a top surface of the central member of the rail assembly.

20 Claims, 12 Drawing Sheets

(56) References Cited

U.S. PATENT DOCUMENTS

| | | | |
|---|---|---|---|
| 2019/0375314 A1* | 12/2019 | Quast | B60N 2/0727 |
| 2020/0086767 A1* | 3/2020 | Ogasawara | B60N 2/0715 |
| 2020/0108737 A1 | 4/2020 | Runde et al. | |
| 2020/0247272 A1* | 8/2020 | Line | B60N 2/067 |
| 2020/0254907 A1* | 8/2020 | Nakano | B60N 2/42781 |
| 2020/0282868 A1* | 9/2020 | Komiyama | B60N 2/02253 |
| 2020/0298733 A1* | 9/2020 | Bhat | B33Y 80/00 |
| 2021/0268939 A1* | 9/2021 | Hao | B60N 2/0705 |
| 2021/0316641 A1* | 10/2021 | Cho | B60N 2/1635 |
| 2022/0017000 A1* | 1/2022 | Zhao | B60N 2/01516 |
| 2022/0144147 A1* | 5/2022 | Zhang | B60N 2/067 |
| 2022/0219569 A1* | 7/2022 | Zhao | B60N 2/08 |
| 2022/0340050 A1* | 10/2022 | Kondrad | B60N 2/0818 |
| 2023/0062149 A1* | 3/2023 | Zhao | B60N 2/06 |

\* cited by examiner

US 11,904,735 B2

TRANSLATION ASSEMBLY FOR A VEHICLE

FIELD OF THE DISCLOSURE

The present disclosure generally relates to a vehicle. More specifically, the present disclosure relates to a translation assembly for a vehicle.

BACKGROUND OF THE INVENTION

Vehicles are often provided with some degree of adjustability in a passenger compartment of the vehicle. For example, components of the vehicle that are provided in the passenger compartment (e.g., seating assemblies) can be adjusted to meet the preferences of occupants of various sizes. Additionally, in some examples, vehicles are capable of adjustments to components of the passenger compartment to increase a cargo area of the vehicle. However, additional solutions are needed that enable increased adjustability in the passenger compartment of the vehicle.

SUMMARY OF THE INVENTION

According to a first aspect of the present invention, a translation assembly for a vehicle includes a rail assembly that defines a first channel, a second channel, and a central member that extends between the first and second channels. A carriage assembly couples to the rail assembly. The carriage assembly is movable relative to the rail assembly. The carriage assembly includes a first rail engagement structure that extends into the rail assembly and is received within the first channel; a second rail engagement structure that extends into the rail assembly and is received within the second channel; and a carriage housing that is coupled to the first and second rail engagement structures. The carriage housing extends between the first and second rail engagement structures. The carriage assembly also includes one or more drive assemblies that engage with a top surface of the central member of the rail assembly. The one or more drive assemblies each include a drive motor coupled to one or more drive wheels by a driveshaft.

Embodiments of the first aspect of the invention can include any one or a combination of the following features:
  the central member of the rail assembly is coated with a first material, wherein each of the one or more drive wheels are coated with a second material, and wherein the first and second materials have a static coefficient of friction of at least about 0.6 with one another;
  the first and second materials are each a rubber-based material;
  at least one looseness adapter coupled to each of the first rail engagement structure and the second rail engagement structure, wherein each of the at least one looseness adapter engages with a first interior surface and a second interior surface of a corresponding one of the first channel and the second channel, and wherein the first interior surface and the second interior surface are non-parallel to one another;
  each of the at least one looseness adapters includes a first resilient arm that engages with the first interior surface and a second resilient arm that engages with the second interior surface;
  the first and second resilient arms each includes at least two inflection points; and
  the one or more drive assemblies include a first drive assembly and a second drive assembly, wherein the first drive assembly affects movement of the carriage assembly relative to the rail assembly in a first direction, and wherein the second drive assembly affects movement of the carriage assembly relative to the rail assembly in a second direction.

According to a second aspect of the present disclosure, s translation assembly for a vehicle includes a rail assembly that defines a first channel, a second channel, and a central member that extends between the first and second channels. A carriage assembly couples to the rail assembly. The carriage assembly is movable relative to the rail assembly. The carriage assembly includes a carriage housing and one or more drive assemblies. The one or more drive assemblies engage with a top surface of the central member of the rail assembly. The one or more drive assemblies each includes a drive motor coupled to one or more drive wheels by a driveshaft. The central member of the rail assembly is coated with a first material. The one or more drive wheels are coated with a second material. The first and second materials have a static coefficient of friction of at least about 0.6 with one another.

Embodiments of the second aspect of the present disclosure can include any one or a combination of the following features:
  the carriage assembly includes a first rail engagement structure that extends into the rail assembly and is received within the first channel and a second rail engagement structure that extends into the rail assembly and is received within the second channel;
  the carriage housing is coupled to the first and second rail engagement structures, wherein the carriage housing extends between the first and second rail engagement structures;
  at least one looseness adapter coupled to each of the first rail engagement structure and the second rail engagement structure, wherein each of the at least one looseness adapter engages with a first interior surface and a second interior surface of a corresponding one of the first channel and the second channel, and wherein the first interior surface and the second interior surface are non-parallel to one another;
  each of the at least one looseness adapters includes a first resilient arm that engages with the first interior surface and a second resilient arm that engages with the second interior surface;
  the first and second resilient arms each include at least two inflection points;
  the one or more drive assemblies include a first drive assembly and a second drive assembly, wherein the first drive assembly affects movement of the carriage assembly relative to the rail assembly in a first direction, and wherein the second drive assembly affects movement of the carriage assembly relative to the rail assembly in a second direction; and
  the first and second materials are a rubber-based material.

According to a third aspect of the present disclosure, a translation assembly for a vehicle includes a rail assembly that defines a first channel, a second channel, and a central member extends between the first and second channels. A carriage assembly couples to the rail assembly. The carriage assembly is movable relative to the rail assembly. The carriage assembly includes a first rail engagement structure that extends into the rail assembly and is received within the first channel and a second rail engagement structure that extends into the rail assembly and is received within the second channel. The carriage assembly also includes at least one looseness adapter that is coupled to each of the first rail engagement structure and the second rail engagement structure. Each of the at least one looseness adapter engages with a first interior surface and a second interior surface of a corresponding one of the first channel and the second channel. The first interior surface and the second interior surface are non-parallel to one another. The carriage assembly further includes a carriage housing that is coupled to the first and second rail engagement structures. The carriage housing extends between the first and second rail engagement structures. One or more drive assemblies are provided on the carriage assembly that affect movement of the carriage assembly relative to the rail assembly.

Embodiments of the third aspect of the present disclosure can include any one or a combination of the following features:
- each of the at least one looseness adapters includes a first resilient arm that engages with the first interior surface and a second resilient arm that engages with the second interior surface;
- the first and second resilient arms each include at least two inflection points;
- the one or more drive assemblies engage with a top surface of the central member of the rail assembly, wherein the one or more drive assemblies each include a drive motor coupled to one or more drive wheels by a driveshaft; and
- the central member of the rail assembly is coated with a first material, wherein each of the one or more drive wheels are coated with a second material, wherein the first and second materials have a static coefficient of friction of at least about 0.6 with one another, and wherein the first and second materials are each a rubber-based material.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
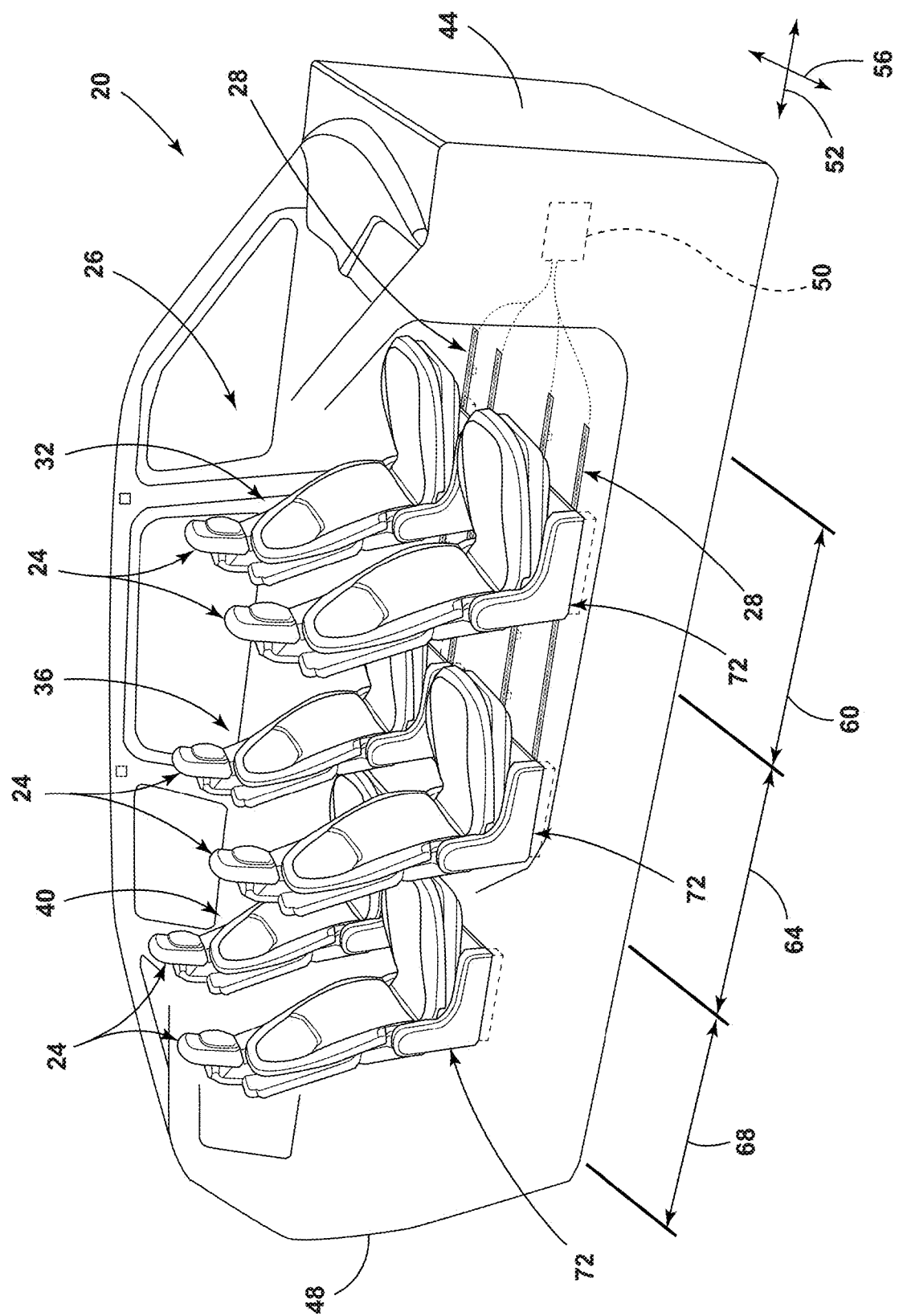
FIG. 1 is a side perspective view of a vehicle, illustrating seating assemblies coupled to rail assemblies, according to one example.
Figure 2:
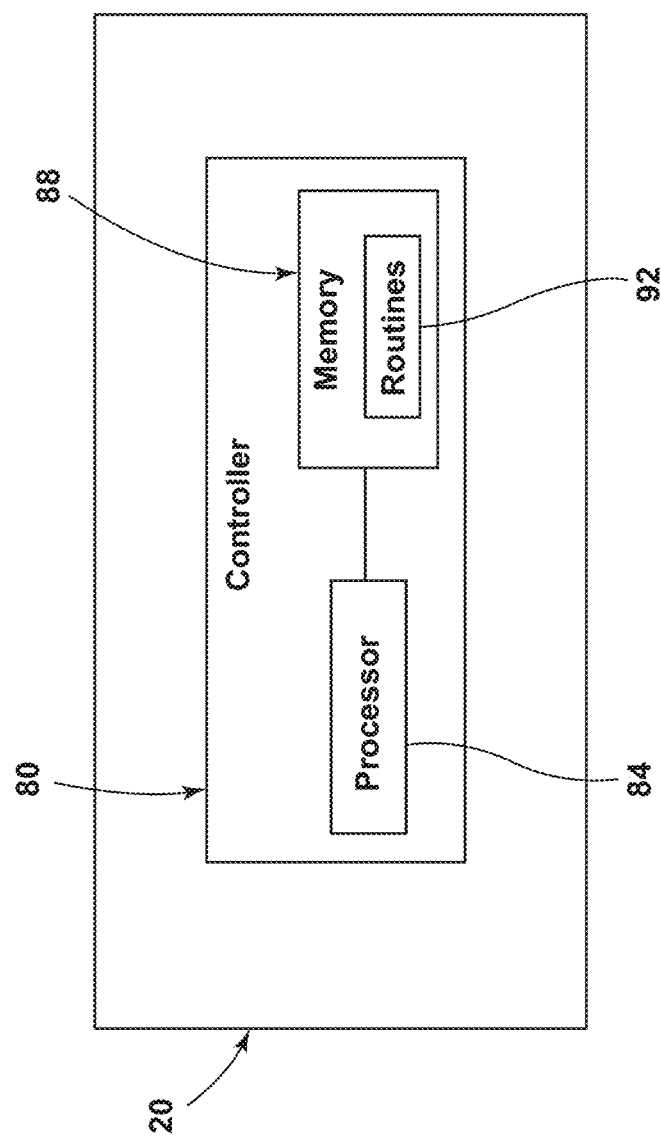
FIG. 2 is a schematic representation of the vehicle, illustrating a controller, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a translation assembly for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-13, reference numeral 20 generally designates a vehicle. The vehicle 20 may be a motor vehicle. For example, the vehicle 20 may be a land-based vehicle (e.g., an automobile, a motorcycle, a train, etc.), an air-based vehicle (e.g., an airplane, a helicopter, etc.), and/or a water-based vehicle (e.g., a boat or other watercraft). While the vehicle 20 may be a motor vehicle, the present disclosure is not limited to internal combustion engines as a source of locomotive power for the vehicle 20. Rather, alternative sources may be utilized in providing locomotive power to the vehicle 20. For example, locomotive power may be provided to the vehicle 20 by electric motors, fuel cells, and/or petroleum-based fuel engines. According to various examples, the vehicle 20 may be driver-controlled, semi-autonomous, fully-autonomous, or any combination of user-controlled and automated. For example, the semi-autonomous example of the vehicle 20 may perform many or all-commuting functions (e.g., accelerating, braking, turning, signaling, etc.).

Referring again to FIGS. 1-13, the vehicle 20 includes a plurality of seating assemblies 24 that are positioned within a passenger compartment 26 of the vehicle 20. The seating assemblies 24 each engage with a rail assembly 28. The seating assemblies 24 can be arranged within the passenger compartment 26 to define a first row 32, a second row 36, and/or a third row 40. The first row 32 can be proximate to a front 44 of the vehicle 20. The second row 36 and/or third row 40 can be proximate to a rear 48 of the vehicle 20. The rail assembly 28 extends along a longitudinal direction 52 of the vehicle 20. The vehicle 20 can be equipped with multiple rail assemblies 28 that are arranged parallel to one another and offset from one another in a lateral direction 56. The rail assemblies 28 can extend from a front region 60 of the passenger compartment 26 to a middle region 64 of the passenger compartment 26. In some examples, the rail assemblies 28 can extend from the front region 60, through the middle region 64, and into a rear region 68 of the passenger compartment 26. Accordingly, seating assemblies 24 may traverse a length of the rail assembly 28 to adjust a position of the seating assemblies 24 between the first row 32, the second row 36, and/or the third row 40. Each of the seating assemblies 24 can be coupled to the rail assembly 28 by way of a seat base 72. For example, the seat base 72 can include a carriage assembly 76 that couples the seating assembly 24 to the rail assembly 28. The carriage assembly 76 and the rail assembly 28 can be collectively referred to as a translation assembly 78. The vehicle 20 includes a controller 80 that includes a processor 84 and memory 88. The memory 88 stores software routines 92 that are executable by the processor 84. In various situations, the software routines 92 within the memory 88 may be accessed by the controller 80 and/or the processor 84 in response to an input from the vehicle 20 (e.g., a request to adjust a position of one of the seating assemblies 24).

Referring further to FIGS. 1-13, as stated above, the translation assembly 78 includes the rail assembly 28 and the carriage assembly 76. The rail assembly 28 defines a first channel 96 and a second channel 100. A central member 104 of the rail assembly 28 extends between the first and second channels 96, 100. In some examples, the rail assembly 28 defines a third channel 108. In such an example, the central member 104 can be separated into a first section 112 and a second section 116. In such an example, the first section 112 can extend between the first channel 96 and the third channel 108 and the second section 116 can extend between the second channel 100 and the third channel 108. The carriage assembly 76 engages with the rail assembly 28 in a manner that permits movement of the carriage assembly 76 relative to the rail assembly 28. The carriage assembly 76 includes a first rail engagement structure 120 and a second rail engagement structure 124. The first rail engagement structure 120 extends into the rail assembly 28 and is received within the first channel 96. For example, the first channel 96 may define a first slot 128 in an upper surface thereof that the first rail engagement structure 120 extends through. The second rail engagement structure 124 extends into the rail assembly 28 and is received within the second channel 100. For example, the second channel 100 may define a second slot 132 in an upper surface thereof that the second rail engagement structure 124 extends through.

Referring still further to FIGS. 1-13, a carriage housing 136 is coupled to the first and second rail engagement structures 120, 124. The carriage housing 136 extends between the first and second rail engagement structures 120, 124. One or more drive assemblies 140 engage with a top surface 144 of the central member 104 of the rail assembly 28. The one or more drive assemblies 140 each include a drive motor 148 coupled to one or more drive wheels 152 by a driveshaft 156. The one or more drive assemblies 140 can include a first drive assembly 140A and a second drive assembly 140B. In some examples, the first drive assembly 140A can affect movement of the carriage assembly 76 relative to the rail assembly 28 in a first direction (e.g., a forward direction) while the second drive assembly 140B affects movement of the carriage assembly 76 relative to the rail assembly 28 in a second direction (e.g., a rearward direction). Alternatively, the first and second drive assemblies 140A, 140B may both be operable in a clockwise direction and a counterclockwise direction such that the first and second drive assemblies 140A, 140B can cooperate to move the carriage assembly 76 relative to the rail assembly 28 more rapidly. In some examples, the central member 104 of the rail assembly 28 can be coated with a first material and each of the one or more drive wheels 152 can be coated with a second material. In various examples, a static coefficient of friction between the first and second materials can be at least about 0.1, at least about 0.2, at least about 0.3, at least about 0.4, at least about 0.5, at least about 0.6, at least about 0.7, at least about 0.8, at least about 0.9, at least about 1.0, at least about 1.1, and/or combinations or ranges thereof. For example, the static coefficient of friction between the first and second materials can be at least about 0.6 with one another. In some examples, the carriage assembly 76 can be provided with at least one looseness adapter 160 that is coupled to each of the first rail engagement structure 120 and the second rail engagement structure 124. Each of the at least one looseness adapters 160 engages with a first interior surface 164 and a second interior surface 168 of a corresponding one of the first channel 96 and the second channel 100. The first interior surface 164 and the second interior surface 168 are non-parallel to one another.

Figure 3:
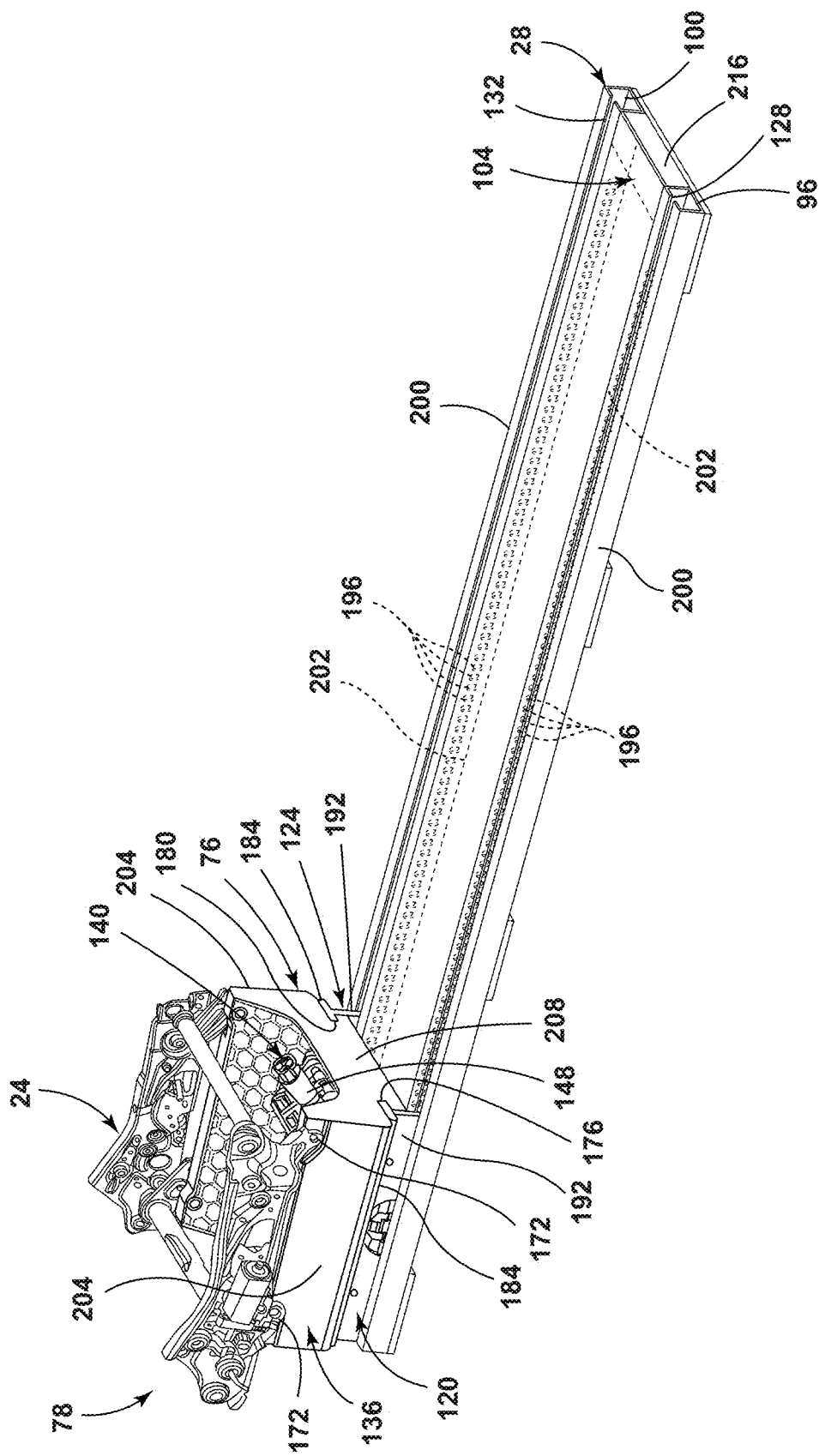
FIG. 3 is a side perspective view of a translation assembly, illustrating the seating assembly, the rail assembly, and a carriage assembly, according to one example.
Figure 4:
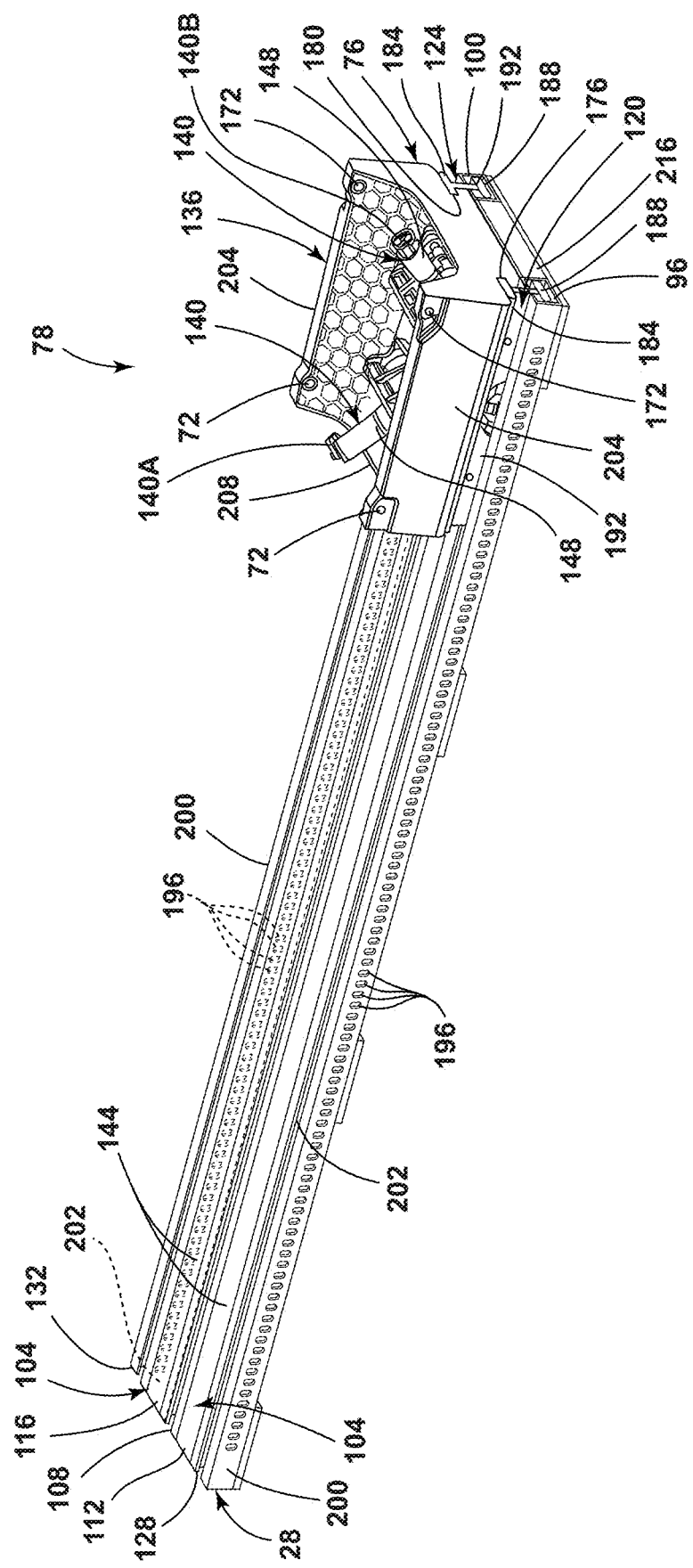
FIG. 4 is a side perspective view of the translation assembly, illustrating the rail assembly and the carriage assembly, according to another example.
Figure 5:
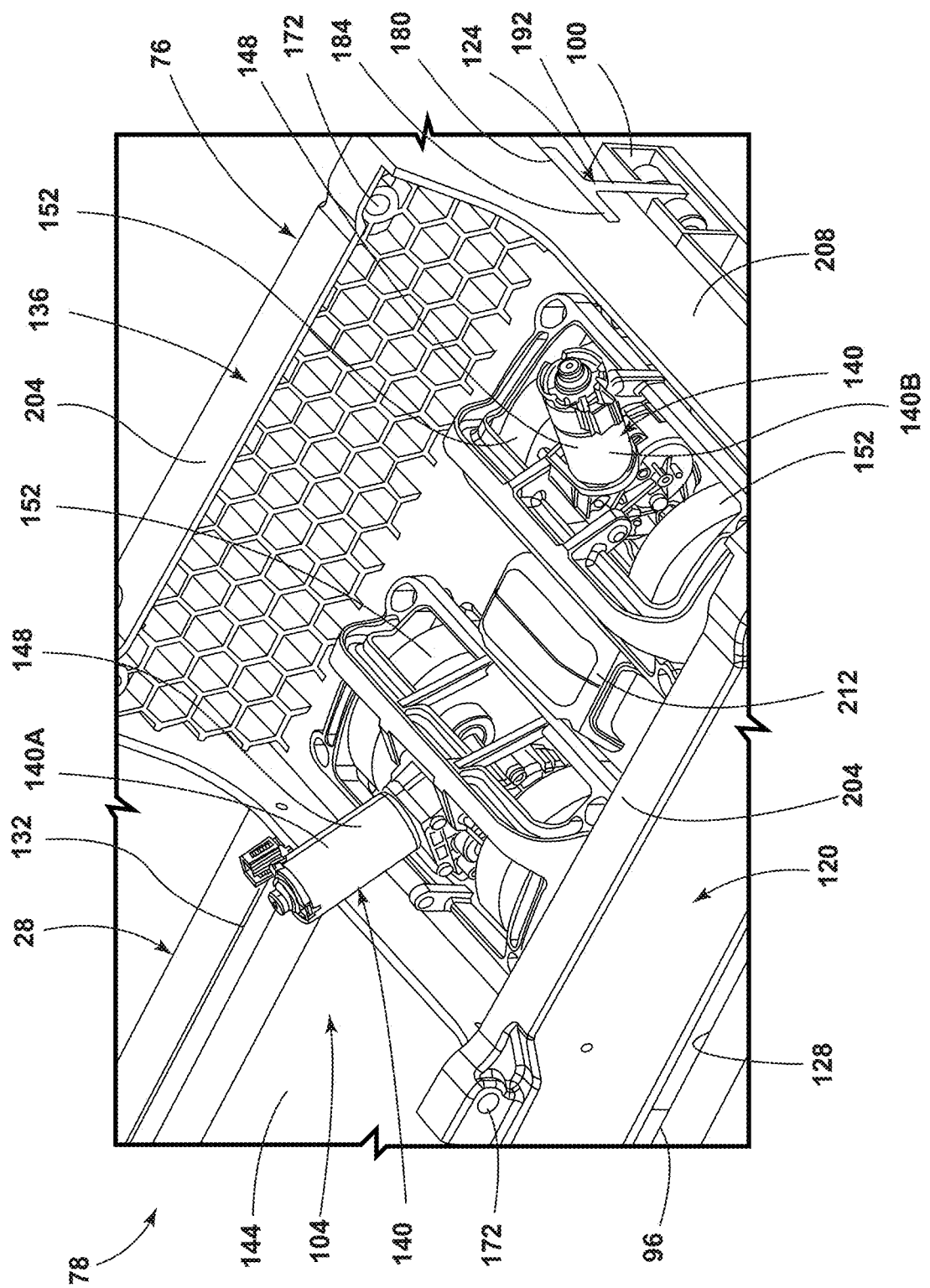
FIG. 5 is a top perspective view of the carriage assembly, illustrating first and second drive assemblies, according to one example.
Figure 6:
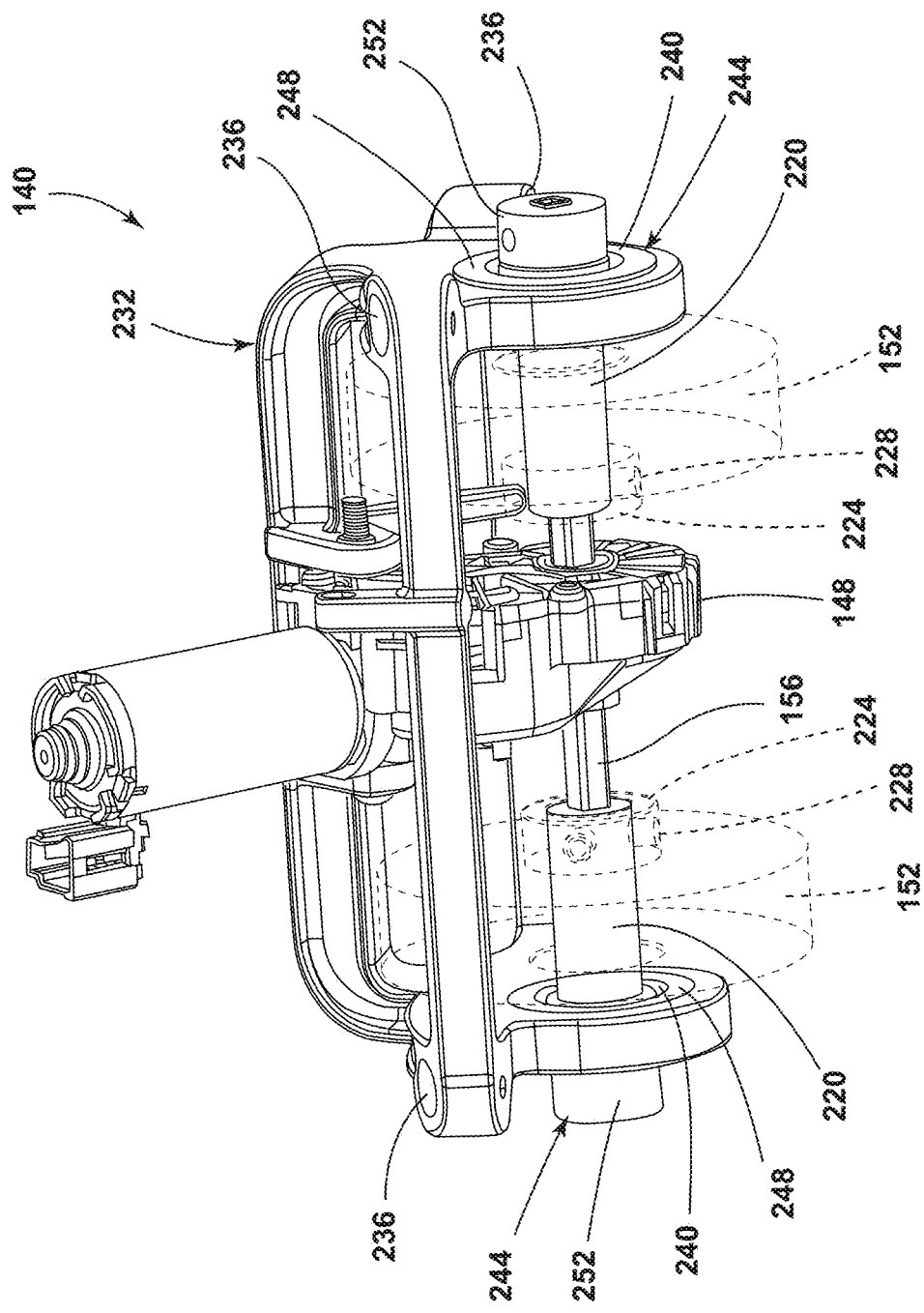
FIG. 6 is a front perspective view of one of the drive assemblies, according to one example.
Figure 7:
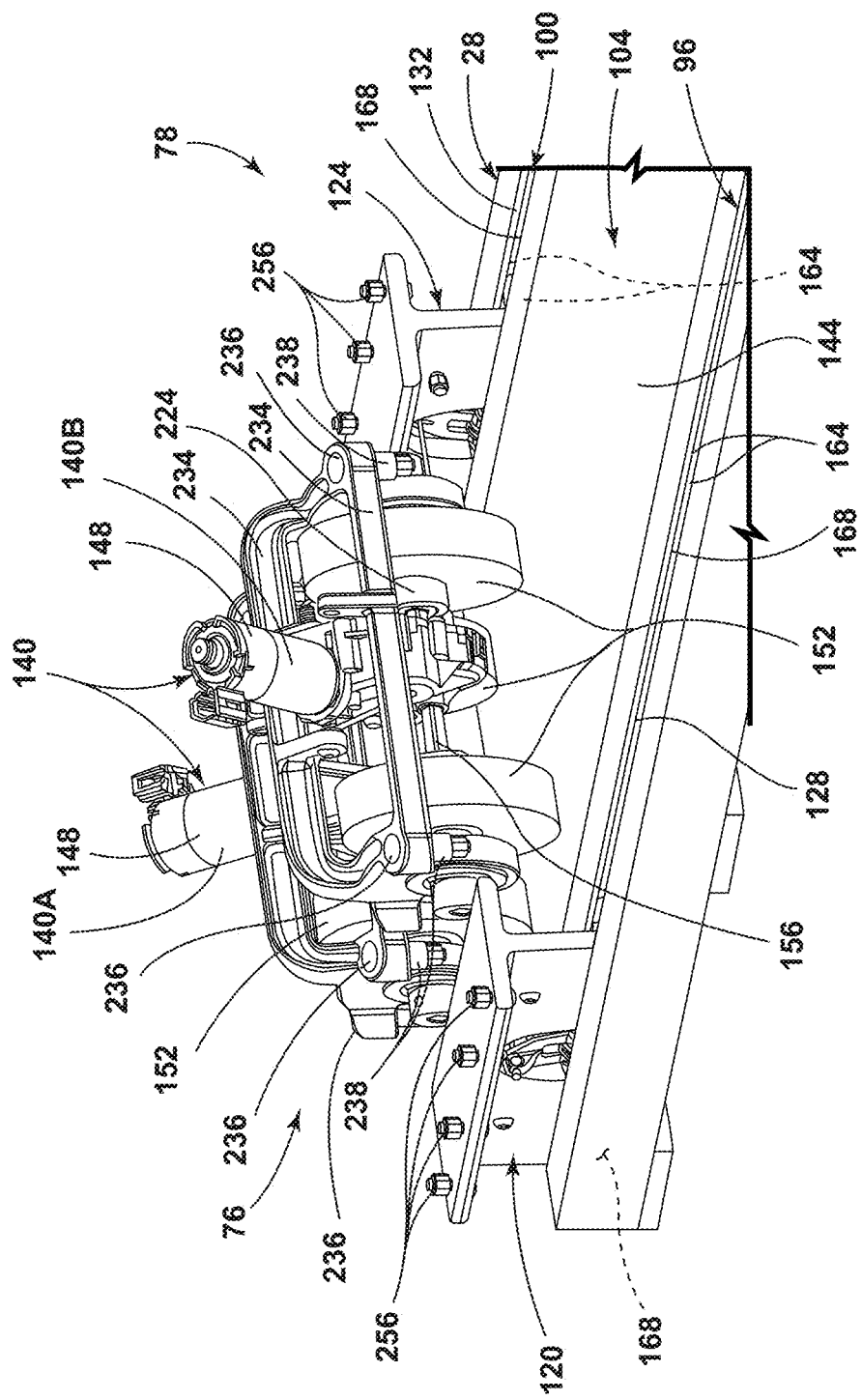
FIG. 7 is a front perspective view of the translation assembly, illustrating an interaction between components of the carriage assembly and the rail assembly, according to one example.
Figure 8:
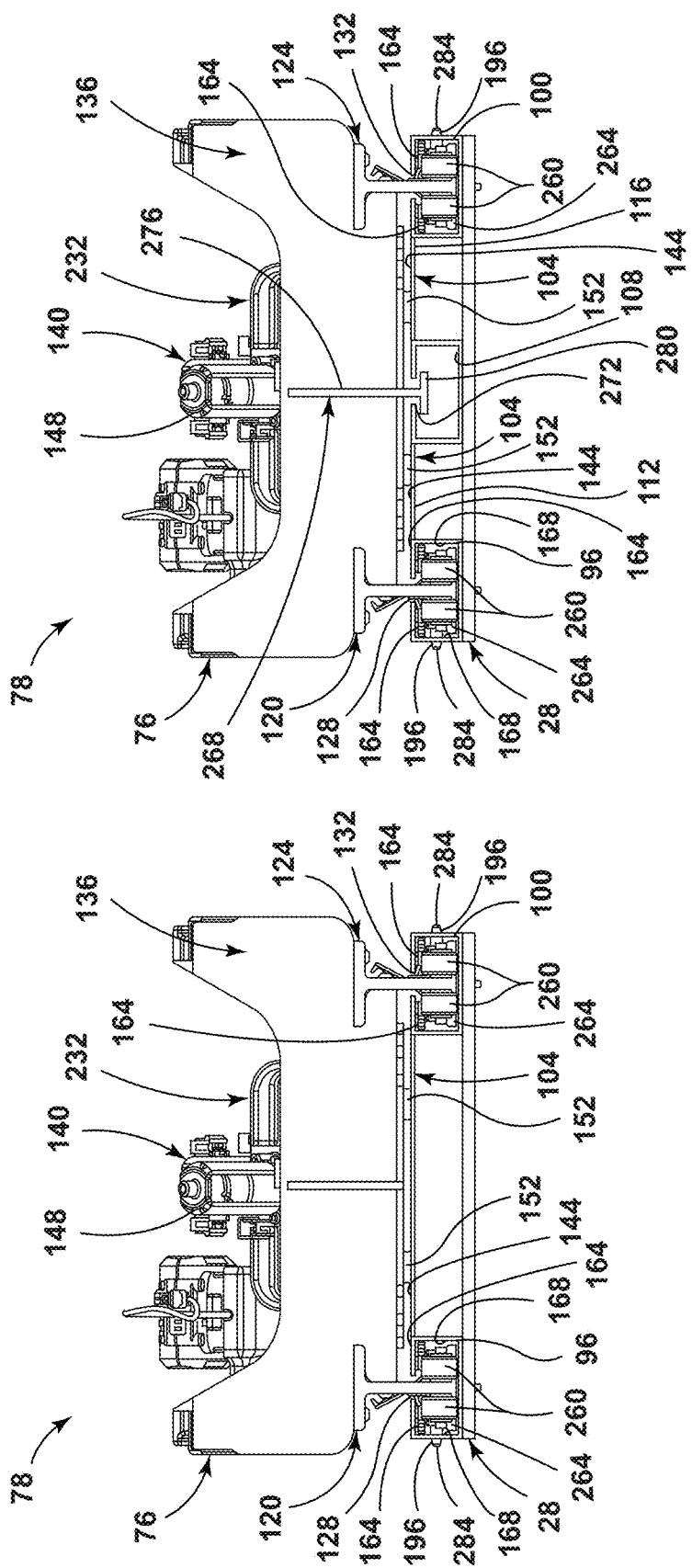
FIG. 8A is an end view of the translation assembly, illustrating the interaction between the carriage assembly and the rail assembly, according to one example.
FIG. 8B is an end view of the translation assembly, illustrating the interaction between the carriage assembly and the rail assembly, according to another example.

Referring now to FIGS. 3-5, the seating assembly 24 can be coupled to the carriage assembly 76 at an upper region of the carriage assembly 76. For example, the carriage assembly 76 may be provided with fastener apertures 172 that correspond with complementary structures on the seating assembly 24. The fastener apertures 172 can receive a fastener that secures the seating assembly 24 to the carriage assembly 76. The first and second rail engagement structures 120, 124 can be coupled to a lower region of the carriage assembly 76. For example, the lower region of the carriage assembly 76 may define a first receptacle 176 and a second receptacle 180 that receive a portion of the first rail engagement structure 120 and the second rail engagement structure 124, respectively. The first and second rail engagement structures 120, 124 can be configured with any suitable shape. In the depicted example, the first and second rail engagement structures 120, 124 are each configured with an I-shaped cross-section. Accordingly, the first and second rail engagement structures 120, 124 each include an upper head 184, a lower head 188, and a slot member 192. The slot member 192 extends between the upper head 184 and the lower head 188. The upper head 184 and the lower head 188 may be generally horizontal in orientation while the slot member 192 that extends between the upper head 184 and the lower head 188 may extend in a generally vertical direction. With such an arrangement, the first and second rail engagement structures 120, 124 are able to provide vertical support to the carriage assembly 76 along at least a portion of a surface area of the upper head 184 and lateral support to the carriage assembly 76 along at least a portion of an interior surface area of the slot members 192. Additionally, the dimensions and orientation of the lower head 188 are able to retain the carriage assembly 76 to the rail assembly 28 while also providing a surface area upon which additional components of the carriage assembly 76 can be mounted. Further, the slot members 192 of the first and second rail engagement structures 120, 124 are able to extend through the first and second slots 128, 132 of the first and second channel 96, 100, respectively.

Referring again to FIGS. 3-5, in various examples, lock apertures 196 may be defined by an exterior wall 200 of the first channel 96 and/or the second channel 100 (see FIG. 4). Alternatively, the lock apertures 196 may be defined by an interior wall 202 of the first channel 96 and/or the second channel 100 (see FIG. 3). The carriage housing 136 can be generally U-shaped with carriage walls 204 that generally correspond with the first and second rail engagement structures 120, 124 and a carriage body 208 that extends between the carriage walls 204. The carriage walls 204 can extend vertically above the carriage body 208 such that a chamber is defined by the carriage walls 204 and the carriage body 208. The chamber defined by the carriage walls 204 and the carriage body 208 can house various components of the carriage assembly 76 (e.g., components of the drive assemblies 140). In various examples, the chamber defined by the carriage housing 136 can include a battery 212 housed therein. In the illustrated example, the battery 212 is positioned between first and second ones of the drive assemblies 140 and can provide power to both of the drive assemblies 140. When the battery 212 is provided on the carriage assembly 76, the rail assembly 28 may be provided with a charging module 216 that is configured to charge the battery 212. For example, the charging module 216 may be positioned at one end of the rail assembly 28 or at a "home" position for a given one of the carriage assemblies 76. For example, one of the charging modules 216 may be provided at a plurality of locations along a length of the rail assembly 28 such that a plurality of the carriage assemblies 76 may be charged simultaneously. In such an example, the charging modules 216 may be positioned along the rail assemblies 28 to correspond with a design position of each of the seating assemblies 24 (e.g., see FIG. 1). Charging of the battery 212 by the charging module 216 can be carried out in a wireless fashion (e.g., inductive charging).

Referring to FIGS. 6-8B, the drive assemblies 140 include the drive motors 148 that are coupled to one or more of the drive wheels 152 by one or more of the driveshafts 156. For example, as depicted, the drive motor 148 may be positioned between two of the drive wheels 152 with the driveshaft(s) 156 extending between the drive motor 148 and each of the drive wheels 152. In various examples, the drive motor 148 may be a DC electric motor. Each of the drive wheels 152 may be provided with a shaft-engagement structure 220 that can aid in transmission of the rotational motion imparted by the driveshaft 156 to the drive wheels 152. Each of the drive wheels 152 can be provided with a retention structure 224 that aids in positioning and/or retaining the drive wheel 152 to the driveshaft 156 and/or the shaft-engagement structure 220. In various examples, the retention structure 224 can define one or more fastener receivers 228 that each receive a fastener (e.g., a threaded fastener). In such an example, the fastener received by each of the fastener receivers 228 may extend through an entirety of a thickness of the retention structure 224 such that the fastener may engage with a surface of the shaft-engagement structure 220 and/or the driveshaft 156 to retain the drive wheel 152 in a desired position relative to the driveshaft 156.

Referring again to FIGS. 6-8B, each of the drive assemblies 140 may be provided with a drive bracket 232. The drive bracket 232 can include one or more cross bars 234. The drive motor 148 can be mounted to one or more of the one or more cross bars 234. The cross bars 234 can aid in countering a torque of the drive motor 148 that is experienced by the drive bracket 232 when the drive motor 148 is engaged and rotating the drive wheels 152. The drive bracket 232 can be employed in packaging the drive assemblies 140, as well as mounting the drive assemblies 140 to the carriage assembly 76. For example, each of the drive brackets 232 may define one or more fastener receptacles 236 that are each configured to receive a fastener therein. The fastener received within each of the fastener receptacles 236 may extend through the fastener receptacles 236 to engage with a portion of the carriage housing 136. For example, the fasteners received within the fastener receptacles 236 may extend through a thickness of the drive bracket 232 to engage with the carriage housing 136 (e.g., a threaded engagement) such that the drive brackets 232 may be retained in a desired position relative to the carriage housing 136. Such a mounting of the drive bracket 232 to the carriage housing 136 can enable transmission of motion imparted by the drive assemblies 140 to the carriage assembly 76 as a whole. In various examples, the drive bracket 232 can include spacers 238 that can be adjusted or replaced to control an engagement between the drive wheels 152 and the central member 104. For example, a thickness of the spacers 238 can be decreased, by adjustment or replacement, to increase a cross-section of contact and/or a degree of deformation between the drive wheels 152 and the central member 104. The drive bracket 232 can define shaft apertures 240 at either side thereof. The shaft apertures 240 may each receive a hub assembly 244 that includes a bracket portion 248 and a shaft portion 252. The bracket portion 248 on the hub assembly 244 may directly engage with the drive bracket 232 at the shaft aperture 240. The driveshaft 156 can extend through the shaft aperture 240 and/or the bracket portion 248 of the hub assembly 244. The shaft portion 252 can engage with a terminal end of the driveshaft 156 on either side of the drive bracket 232 and may retain the driveshaft 156, and the components coupled thereto, in a desired position. The central member 104 can be coated with a first material. For example, the top surface 144 of the central member 104 can be coated with the first material. A surface of the one or more drive wheels 152 may be coated with the second material such that the first and second materials interact with one another when the carriage assembly 76 is coupled to the rail assembly 28. In various examples, the first and second materials may each be made of a rubber-based material. Alternatively, one of the first material and the second material may be a metallic material while the other of the first material and the second material is a rubber-based material. Regardless of the materials used, a static coefficient of friction between the first and second materials of at least about 0.5 may be beneficial in affecting actuation of the carriage assembly 76 relative to the rail assembly 28.

Referring further to FIGS. 6-8B, as stated above, the first and second rail engagement structures 120, 124 may be generally I-shaped. The upper head 184 of the first and second rail engagement structures 120, 124 may be provided with one or more fasteners 256 that can be employed to retain the carriage assembly 76 to the first and second rail engagement structures 120, 124. The lower head 188 of the first and second rail engagement structures 120, 124 may be defined by a plurality of components. For example, the lower head 188 of the first and second rail engagement structures 120, 124 may be at least partially defined by one or more passive wheels 260 that engage with a bottom surface 264 of the first and second channels 96, 100. The passive wheels 260 may be indirectly driven to rotate as a result of driving motion imparted to the drive wheels 152 by the drive motor 148. The passive wheels 260 may be sized and positioned to prevent unintentional decoupling of the first and second rail engagement structures 120, 124 from the first and second channels 96, 100, respectively. For example, an effective width between the one or more passive wheels 260 on a given one of the first and second rail structures 120, 124 may be greater than a width of a corresponding one of the first slot 128 and the second slot 132. In some examples, such as that depicted in FIG. 8B, the carriage assembly 76 can be provided with a guide tab 268 that extends downwardly from the carriage housing 136 to engage with the third channel 108. For example, the third channel 108 can define a third slot 272 that receives the guide tab 268. More specifically, the guide tab 268 can include a guide shaft 276 and a cross member 280. The cross member may be positioned at a terminal end of the guide shaft 276. For example, the cross member 280 may be generally perpendicular to the guide shaft 276 such that the guide tab 268 is generally T-shaped. A width of the cross member 280 may be greater than a width of the opening of the third slot 272 such that unintentional decoupling of the guide tab 268 from the third channel 108 may be prevented. In various examples, a distance between the cross member 280 and an interior surface of the third channel 108 proximate to the third slot 272 may be greater than a distance between components of the first and second rail engagement structures 120, 124 and their corresponding first and second slots 128, 132. Accordingly, the cross member 280 may provide secondary load distribution that aids the first and second rail engagement structures 120, 124 in retaining the carriage assembly 76 to the rail assembly 28. For example, as the first and second rail engagement structures 120, 124 and/or the first and second channels 96, 100 approach or reach a load capacity, the cross member 280 may directly contact the interior surface of the third channel 108 proximate to the third slot 272 to further distribute the experienced load. As will be discussed in further detail herein, the lock apertures 196 may be configured to receive one or more locking pins 284 of the carriage assembly 76.

Figure 9:
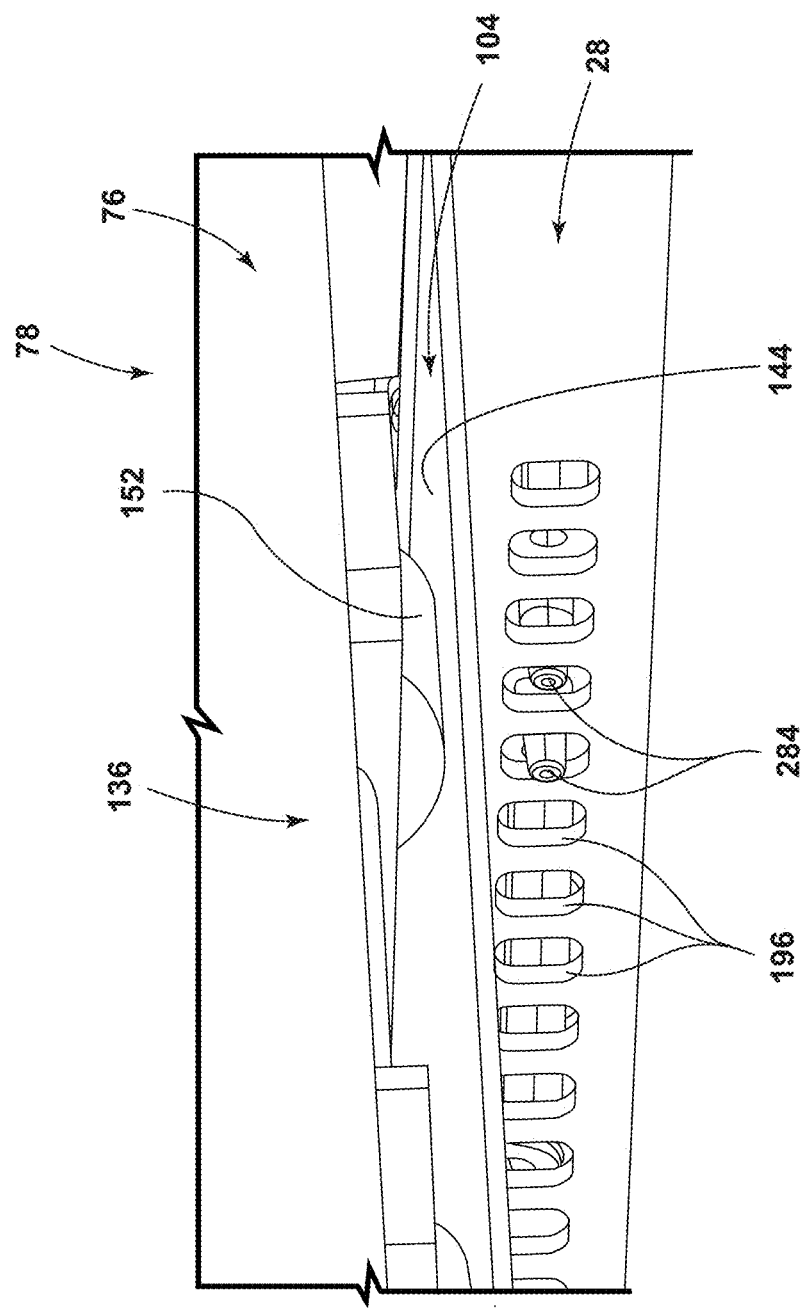
FIG. 9 is a side perspective view of the translation assembly, illustrating lock apertures defined by the rail assembly, according to one example.
Figure 10:
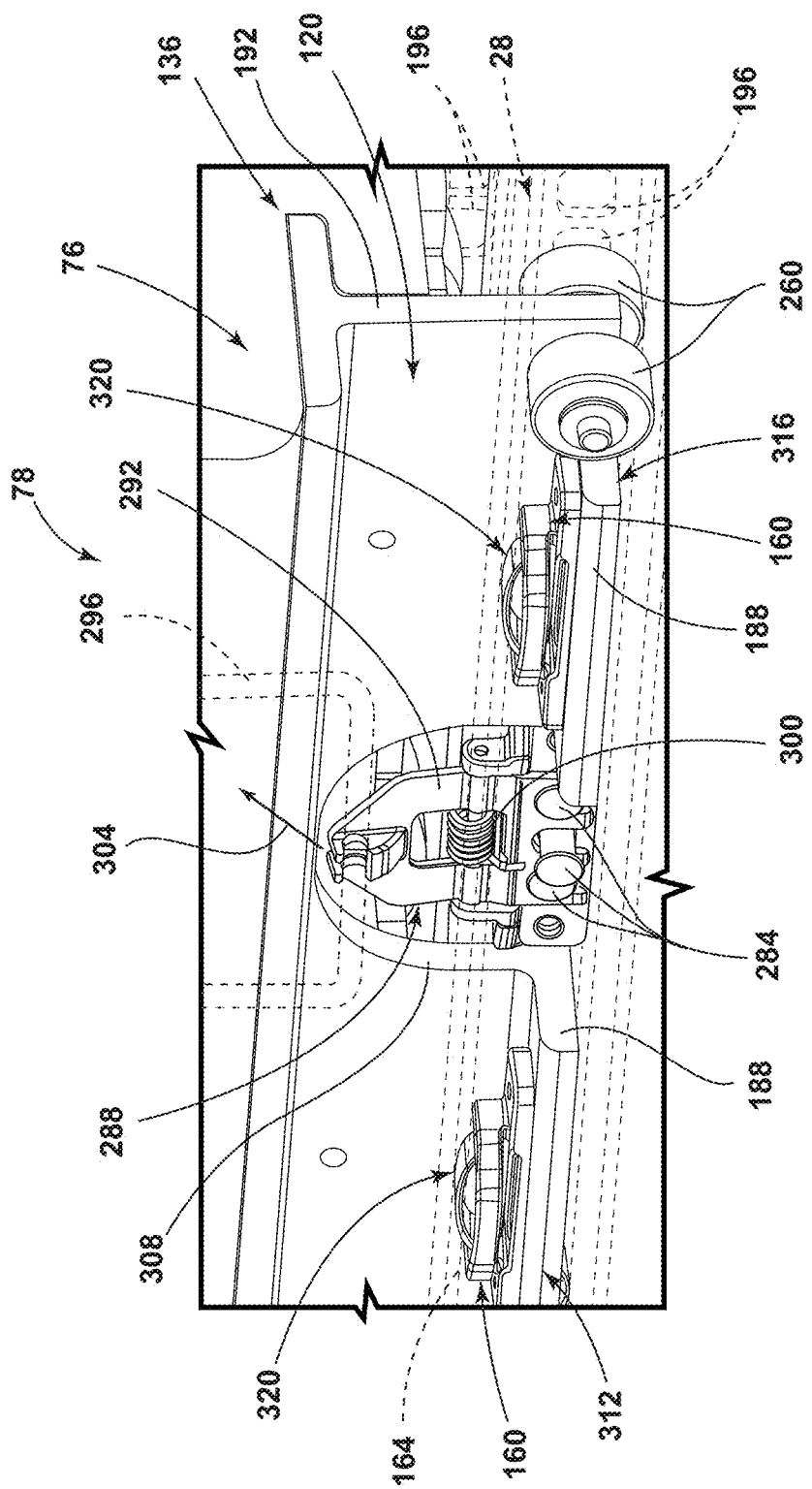
FIG. 10 is a side perspective view of the translation assembly, illustrating the interaction between components of the carriage assembly and the rail assembly, according to one example.
Figure 11:
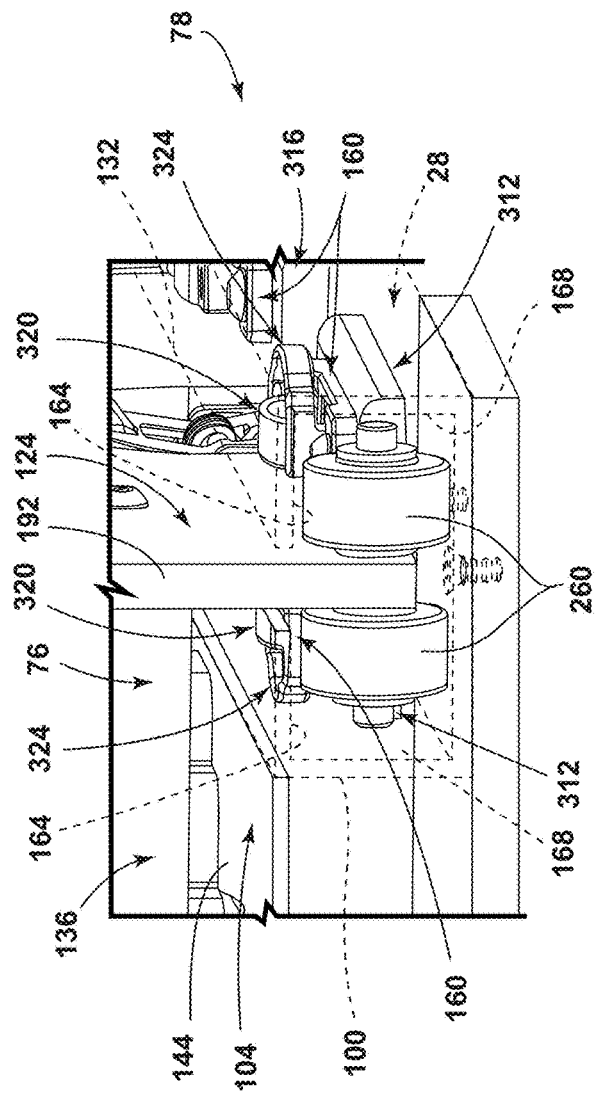
FIG. 11 is a front perspective view of the translation assembly, illustrating the interaction between components of the carriage assembly and the rail assembly, according to one example.
Figure 12:
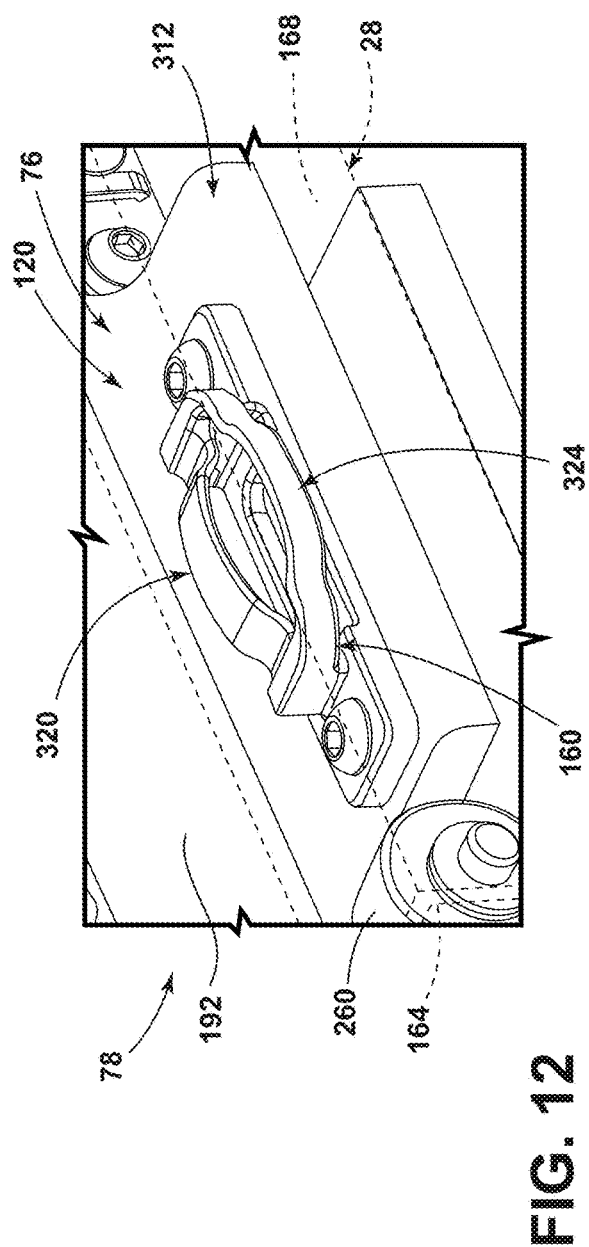
FIG. 12 is a side perspective view a looseness adapter of the carriage assembly, according to one example.
Figure 13:
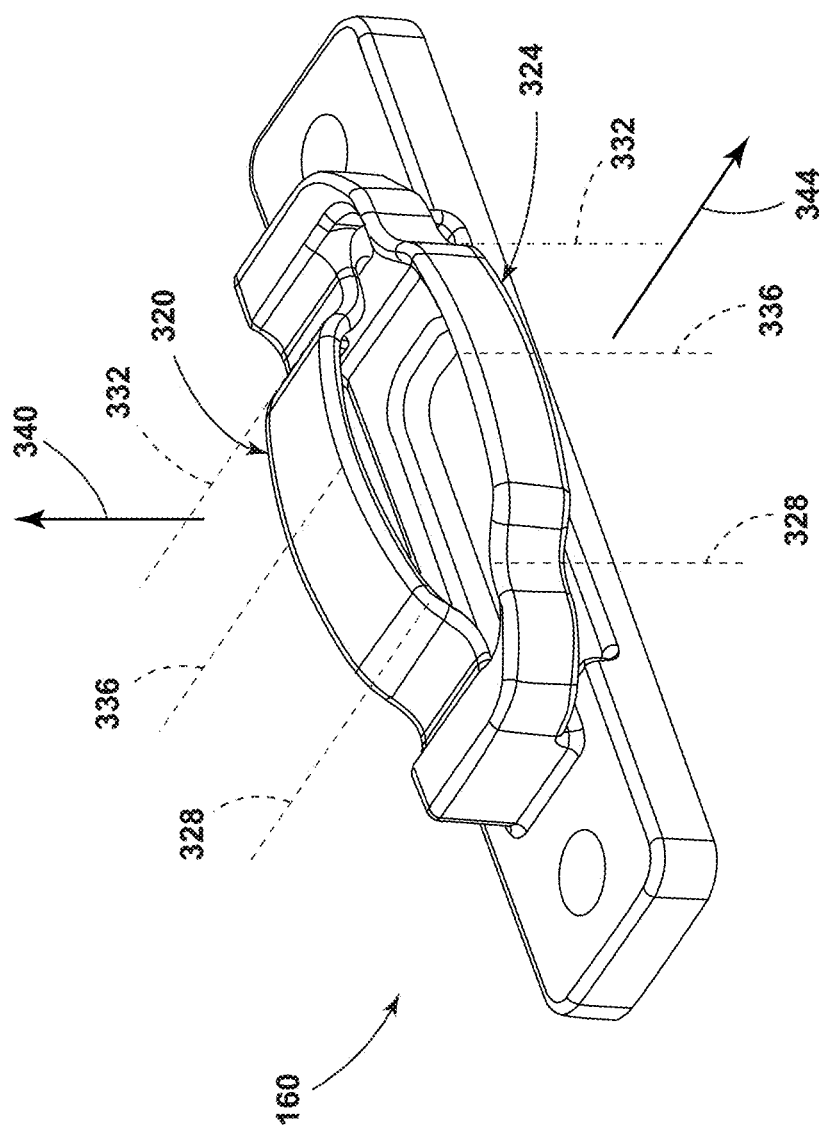
FIG. 13 is a side perspective view of the looseness adapter, illustrating first and second resilient arms thereof, according to one example.

Referring now to FIGS. 9 and 10, the rail system 28 defines the lock apertures 196 that receive one of the locking pins 284 to retain the carriage assembly 76 in a given position along a length of the rail assembly 28. The locking pins 284 are part of a lock assembly 288. The lock assembly 288 includes the locking pins 284, a lock cam 292, a lock actuator 296, and a biasing member 300. The lock cam 292 engages with the locking pins 284 in a manner that enables transmission of movement of the lock cam 292 into movement of the locking pins 284 (e.g., from a locked position to an unlocked position). The biasing member 300 can bias the lock cam 292 to a position that corresponds with the locked position of the locking pins 284. The lock actuator 296 can be positioned at an end of the lock cam 292 that is opposite to the locking pins 284. Upon application of a force against the end of the lock cam 292 in the direction indicated by arrow 304, the locking pins 284 may be moved to the unlocked position such that movement of the carriage assembly 76 relative to the rail assembly 28 may be accomplished. For example, the force applied on the lock actuator 296 in the direction indicated by arrow 304 can induce rotational motion of the lock cam 292 and result in a linear actuation of the locking pins 284 by overcoming the biasing force provided by the biasing member 300. The first rail engagement structure 120 and/or the second rail engagement structure 124 may define a space 308 that receives the lock assembly 288.

Referring to FIGS. 10-13, with the space 308 that is defined by the first rail engagement structure 120 and/or the second rail engagement structure 124, the lower head 188 may be divided into a first portion 312 and a second portion 316. The first and second portions 312, 316 of the lower head 188 can extend to either side of the slot member 192 in a generally symmetrical manner. A top surface of each of the first portions 312 and/or the second portions 316 may be provided with one of the looseness adapters 160. Each of the looseness adapters 160 can include a first resilient arm 320 and a second resilient arm 324. The first resilient arm 320 engages with the first interior surface 164 and the second resilient arm 324 engages with the second interior surface 168. The first and second resilient arms 320, 324 of the looseness adapters 160 aid in preventing chuck, binding, or other forms of misalignment between the carriage assembly 76 and the rail assembly 28. The looseness adapters 160 can prevent misalignment between the carriage assembly 76 and the rail assembly 28 during actuation of the carriage assembly 76 by taking up, or otherwise spanning, a clearance between the lower head 188 and the interior surfaces of the first channel 96 and/or the second channel 100 (e.g., the first interior surface 164 and/or the second interior surface 168). Additionally, the first and second resilient arms 320, 324 can aid in adapting to undulations within the rail assembly 28 and/or absorbing forces that are experienced by the carriage assembly 76. To aid in the absorption of forces and/or undulations, as well as taking up a clearance between the lower head 188 and the rail assembly 28, the first and second resilient arms 320, 324 may be provided with at least one inflection point. In the depicted example, the first and second resilient arms 320, 324 are each provided with a first inflection point 328 and a second inflection point 332. The first and second resilient arms 320, 324 may also include a turning point 336 that is positioned between the first and second inflection points 328, 332. The curvature of the first and second resilient arms 320, 324 can provide a force that bears against the first and second interior surfaces 164, 168, respectively. For example, the first resilient arm 320 can bear against the first interior surface 164 with a vertical force, as indicated by arrow 340. Similarly, the second resilient arm 324 can bear against the second interior surface 168 with a lateral or horizontal force, as indicated by arrow 344. The structure of the looseness adapter 160 can provide space behind the first and second resilient arms 320, 324 to permit movement of the first and second resilient arms 320, 324 (e.g., bending) in a manner that does not limit an intended range of motion of the first and second resilient arms 320, 324.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A translation assembly for a vehicle, comprising:
   a rail assembly that defines a first channel and a second channel, wherein a central member separates the first and second channels; and
   a carriage assembly that couples to the rail assembly, wherein the carriage assembly is movable relative to the rail assembly, and wherein the carriage assembly comprises:
   a first rail engagement structure that extends into the rail assembly and is received within the first channel;
   a second rail engagement structure that extends into the rail assembly and is received within the second channel;
   a carriage housing that is coupled to the first and second rail engagement structures, wherein the carriage housing extends between the first and second rail engagement structures; and
   one or more drive assemblies that engage with a top surface of the central member of the rail assembly, wherein the one or more drive assemblies each comprise a drive motor coupled to one or more drive wheels by a driveshaft.

2. The translation assembly for a vehicle of claim 1, wherein the central member of the rail assembly is coated with a first material, wherein each of the one or more drive wheels are coated with a second material, and wherein the first and second materials have a static coefficient of friction of at least about 0.6 with one another.

3. The translation assembly for a vehicle of claim 2, wherein the first and second materials are each a rubber-based material.

4. The translation assembly for a vehicle of claim 1, further comprising:
   at least one looseness adapter coupled to each of the first rail engagement structure and the second rail engagement structure, wherein each of the at least one looseness adapter engages with a first interior surface and a second interior surface of a corresponding one of the first channel and the second channel, and wherein the first interior surface and the second interior surface are non-parallel to one another.

5. The translation assembly for a vehicle of claim 4, wherein each of the at least one looseness adapters comprises a first resilient arm that engages with the first interior surface and a second resilient arm that engages with the second interior surface.

6. The translation assembly for a vehicle of claim 5, wherein the first and second resilient arms each comprise at least two inflection points.

7. The translation assembly for a vehicle of claim 1, wherein the one or more drive assemblies comprise a first drive assembly and a second drive assembly, wherein the first drive assembly affects movement of the carriage assembly relative to the rail assembly in a first direction, and wherein the second drive assembly affects movement of the carriage assembly relative to the rail assembly in a second direction.

8. The translation assembly for a vehicle of claim 1, wherein the carriage housing defines a first receptacle and a second receptacle on a first lateral side and a second lateral side of the carriage housing, respectively.

9. The translation assembly for a vehicle of claim 8, wherein the first receptacle and the second receptacle are configured to receive the first rail engagement structure and the second rail engagement structure, respectively.

10. A translation assembly for a vehicle, comprising:
   A rail assembly that defines a first channel and a second channel, wherein a central member, raised higher than the first and second channels, extends between and separates the first and second channels; and
   a carriage assembly that couples to the rail assembly, wherein the carriage assembly is movable relative to the rail assembly, and wherein the carriage assembly comprises:
      a carriage housing; and
      one or more drive assemblies that engage with a top surface of the central member of the rail assembly, wherein the one or more drive assemblies each comprise a drive motor coupled to one or more drive wheels by a driveshaft, wherein the central member of the rail assembly is coated with a first material, wherein each of the one or more drive wheels are coated with a second material, and wherein the first and second materials have a static coefficient of friction of at least about 0.6 with one another.

11. The translation assembly for a vehicle of claim 10, wherein the carriage assembly further comprises:
   a first rail engagement structure that extends into the rail assembly and is received within the first channel; and
   a second rail engagement structure that extends into the rail assembly and is received within the second channel.

12. The translation assembly for a vehicle of claim 11, wherein the carriage housing is coupled to the first and second rail engagement structures, and wherein the carriage housing extends between the first and second rail engagement structures.

13. The translation assembly for a vehicle of claim 11, further comprising:
   at least one looseness adapter coupled to each of the first rail engagement structure and the second rail engagement structure, wherein each of the at least one looseness adapter engages with a first interior surface and a second interior surface of a corresponding one of the first channel and the second channel, and wherein the first interior surface and the second interior surface are non-parallel to one another.

14. The translation assembly for a vehicle of claim 13, wherein each of the at least one looseness adapters comprises a first resilient arm that engages with the first interior surface and a second resilient arm that engages with the second interior surface.

15. The translation assembly for a vehicle of claim 14, wherein the first and second resilient arms each comprise at least two inflection points.

16. The translation assembly for a vehicle of claim 10, wherein the one or more drive assemblies comprise a first drive assembly and a second drive assembly, wherein the first drive assembly affects movement of the carriage assembly relative to the rail assembly in a first direction, and wherein the second drive assembly affects movement of the carriage assembly relative to the rail assembly in a second direction.

17. The translation assembly for a vehicle of claim 10, wherein the first and second materials are a rubber-based material.

18. A translation assembly for a vehicle, comprising:
   a rail assembly that defines a first channel and a second channel, wherein a central member extends between the first and second channels; and
   a carriage assembly that couples to the rail assembly, wherein the carriage assembly is movable relative to the rail assembly, and wherein the carriage assembly comprises:
      a first rail engagement structure that extends into the rail assembly and is received within the first channel;
      a second rail engagement structure that extends into the rail assembly and is received within the second channel;
      at least one looseness adapter coupled to each of the first rail engagement structure and the second rail engagement structure, wherein each of the at least one looseness adapter engages with a first interior surface and a second interior surface of a corresponding one of the first channel and the second channel, and wherein the first interior surface and the second interior surface are non-parallel to one another wherein each of the at least one looseness adapters comprises a first resilient arm, having at least two inflection points, that engages with the first interior surface and a second resilient arm, having at least two inflection points, that engages with the second interior surface;
      a carriage housing that is coupled to the first and second rail engagement structures, wherein the carriage housing extends between the first and second rail engagement structures; and
      one or more drive assemblies that affect movement of the carriage assembly relative to the rail assembly.

19. The translation assembly for a vehicle of claim 18, wherein the one or more drive assemblies engage with a top surface of the central member of the rail assembly, and wherein the one or more drive assemblies each comprise a drive motor coupled to one or more drive wheels by a driveshaft.

20. The translation assembly for a vehicle of claim 19, wherein the central member of the rail assembly is coated with a first material, wherein each of the one or more drive wheels are coated with a second material, wherein the first and second materials have a static coefficient of friction of at least about 0.6 with one another, and wherein the first and second materials are each a rubber-based material.

\* \* \* \* \*